Patented Nov. 17, 1953

2,659,657

UNITED STATES PATENT OFFICE 2,659,657

METHOD OF MAKING INORGANIC FLUORINE-CONTAINING COMPOUNDS OF ALUMINUM

William A. La Lande, Jr., Plymouth Meeting, and Isadore Mockrin, Philadelphia, Pa., assignors to The Pennsylvania Salt Manufacturing Company, Philadelphia, Pa., a corporation of Pennsylvania No Drawing. Application August 30, 1952, Serial No. 307,377

11 Claims. (Cl. 23—88)

This invention relates to the manufacture of fluorine-containing aluminum compounds.

Methods of preparing various inorganic metal fluoride compounds are also described in our co-pending application Ser. No. 307,378, filed August 30, 1952.

We have discovered that several valuable fluorine-containing aluminum compounds of substantial commercial importance can be prepared by reacting sodium fluosilicate with aluminum sulfate under substantially anhydrous conditions in the form of dry powders in the manner hereinafter more fully described. Among the compounds that can be prepared in this manner which are of particular commercial importance are synthetic cryolite, synthetic chiolite and aluminum fluoride.

In preferred practice, substantially dry aluminum sulfate is ground together with substantially dry sodium fluosilicate in the stoichiometrical portions necessary to produce synthetic cryolite, synthetic chiolite or aluminum fluoride and the mixture then heated. The products obtained have exceptionally low silicon content, and when anhydrous aluminum sulfate is used, products having silicon content of less than 0.5% silica can be obtained (silica content, throughout the specification and claims, is total Si as $SiO_2$). It is generally desirable in the preparation of cryolite or chiolite to heat the mixture to a temperature above 400° C., a temperature of 500° to 650° C. generally being preferred. The reaction for forming the aluminum fluoride can generally be initiated at somewhat lower temperatures, a reaction occurring at temperatures as low as 200° C. However, for this reaction a temperature of approximately 400° to 550° C. is generally desired. The reactions can be carried substantially to completion giving close to 100% yields of the cryolite and chiolite and up to 95% yields of the aluminum fluoride.

The reactions for preparing the aluminum fluoride, synthetic cryolite and synthetic chiolite can be generally illustrated by the following formulae, the formulae giving the molar ratios of the reactants to be used in order to obtain the desired product:

$$3Na_2SiF_6 + Al_2(SO_4)_3 \rightarrow 2AlF_3 + 3Na_2SO_4 + 3SiF_4$$
$$6Na_2SiF_6 + Al_2(SO_4)_3 \rightarrow 2Na_3AlF_6 + 3Na_2SO_4 + 6SiF_4$$
$$14Na_2SiF_6 + 3Al_2(SO_4)_3 \rightarrow 2Na_5Al_3F_{14} + 9Na_2SO_4 + 14SiF_4$$

The silicon fluoride, which is given off as a gas, can readily be reacted with inexpensive raw materials such as sodium chloride and sodium sulfate and the resulting sodium fluosilicate re-used in the production of more of the metal fluorides. The sodium sulfate can be readily removed from the reaction product by washing in water and can then be reacted, if desired, with the silicon tetrafluoride as above stated. Since aluminum fluoride, synthetic cryolite and synthetic chiolite are all insoluble in water, these materials are readily separated from the sodium sulfate by the water wash.

When it is preferred to carry out the reaction at temperatures somewhat below 600° C., the rate of reaction can be accelerated and a more complete reaction obtained by passing a stream of a dry gas, inert to the reactants, over the reaction mixture during the course of the reaction. Both nitrogen and dry air have been found to be well suited for this purpose. Where an inert gas stream is used during the reaction, it is generally preferred that the dry air or other gas be passed over the reactants at a rate of at least 5 milliliters per minute, per square centimeter of cross-sectional area of the reactor. Where the reaction is carried out at temperatures of 600° C. or greater, it has been found that sweeping the reactants with an inert gas has no substantial effect insofar as accelerating the reaction or aiding in carrying the reaction to completion.

Silicon contamination is generally to be avoided in the manufacture of such materials as aluminum fluoride, cryolite, and chiolite. This is particularly true where the product, such as synthetic cryolite, is to be later used for the production of aluminum. It was heretofore believed that silicon-free synthetic cryolite could not be made by using sodium fluosilicate as a starting material. Indeed it has been stated (The Preparation and Properties of Synthetic Cryolite, by G. Dixon and T. R. Scott, Council for Scientific and Industrial Research, Bulletin No. 214, Melbourne, 1947) that "little credence is given to methods claiming the production of sufficiently pure cryolite (low silica content) from this reagent (sodium fluosilicate)." (Parenthetical matter added.) By the process of the present invention, as previously stated, synthetic cryolite can be prepared with silicon contents of less than 0.5%. If desired, this percentage can be readily reduced even further by treatment with very small quantities of hydrogen fluoride as hereafter more fully described. Thus, a final product containing substantially no silica can be obtained.

In the manufacture of synthetic cryolite for the aluminum industry, another important requisite for the product is that it has as little water content as feasible. Synthetic cryolite is usually made by a process using an aqueous reaction medium, and the synthetic cryolite product has combined water which cannot be driven off without losing some of the fluorine. When cryolite, containing combined water, is used in the cell, the combined water causes a reaction giving off hydrogen fluoride which is extremely objectionable. This is particularly true when the aluminum cell is being started up. Synthetic cryolite prepared by the process of the present invention is substantially free of combined water, for example, samples calcined at 600° C. showed a weight loss of less than 0.2%.

Water vapor in the reaction atmosphere has a tendency to rapidly raise the silicon content in the final product and is, therefore, to be avoided. In view of this, it is surprising that the hydrate of aluminum sulfate can be used for carrying out the process of the present invention in place of anhydrous aluminum sulfate without substantially increasing the silica present in the final product. Thus, for example, by using the hydrate, a cryolite having a silica content of 2% prior to treatment with hydrogen fluoride was obtained as compared to a cryolite prepared by using anhydrous aluminum sulfate which had a silica content of 0.7%. Where the hydrate of the aluminum sulfate is used, however, it is preferred that the reaction be carried out in such manner that there can be no accumulation of any moisture which may be driven off from the hydrate at the temperatures of reaction. This can be done by proper equipment design, and is preferably done by sweeping the reactants with a dry inert gas stream. The dry inert gas stream in such instance serves the dual purpose of removing any moisture that may be driven off from the hydrate as well as accelerating the reaction. Since the hydrate of aluminum sulfate can also be used in practicing the process of the present invention, the term "substantially dry" as used in the specification and claims is intended to include conditions wherein the water content is no greater than that which would result in carrying out the reactions of the present invention with the hydrate of aluminum sulfate in the manner heretofore described.

Though sulfates are used in the process of the present invention, another advantage to the process is that products having a low sulfate content are obtained, the sulfate content on analysis generally being below 0.6% (total sulfur as sulfur trioxide).

In making synthetic cryolite, in accordance with our present invention, the sodium fluosilicate and aluminum sulfate are preferably first ground together in the stoichiometrical quantities of six moles sodium fluosilicate per mole of aluminum sulfate. The mixture is then heated to a temperature of 500° to 650° C. The reactants are preferably swept, during the course of the reaction, with an inert gas at a velocity of at least 5 milliliters per minute per square centimeter of cross-sectional area of the reactor. It has been found that occasionally grinding the reactants during the course of the reaction further accelerates the reaction and may, in some instances, be desirable. The grinding may be done either by removing the reactants from the reaction chamber and grinding, or by grinding the reactants in the reaction chamber while maintaining the reactants at the reaction temperature. It is generally preferred that the reactants be ground during the course of the reaction, the total reaction time being approximately one to six hours when temperatures of 600° C. are employed. The grinding may be continuous or the product may be removed from the reaction chamber and ground. In the latter case, this is preferably done several times during the reaction period.

For convenience in separating the synthetic cryolite from the sodium sulfate found in the reaction product, it is highly desirable that the cryolite have the property of rapidly settling to the bottom when the product is digested in water. Various expedients can be resorted to in order to aid in the settling and filtering of the cryolite. However, we have found that a rapidly settling and easily filterable cryolite can be obtained by sweeping the reaction products with a mixture of an inert gas and a small amount of hydrogen fluoride prior to washing. The hydrogen fluoride treatment at this point serves two purposes in that it further reduces the silicon content of the cryolite product and also produces a product which rapidly settles in the wash water and is readily filterable, thus permitting easy separation of the synthetic cryolite from the soluble sodium sulfate. The cryolite obtained is generally of a high order of purity analyzing 0.01% of silica. The yields of cryolite, as compared to the theoretical yield, is also excellent, the yields generally running about 98%.

In our preferred practice of the invention for the production of synthetic cryolite, the sodium fluosilicate and aluminum sulfate are heated together at a temperature of 550° to 650° C. Higher temperatures can be used; however, temperatures sufficiently high to cause fusion of the whole mass should be avoided. Little reaction appears to occur at temperatures much below 400° C.

If the silicon content of the final synthetic cryolite product is found to be too high for use in the electrolytic reduction of aluminum, such, for example, if the product is found to have a silicon content of 1.5%, as obtained by the use of aluminum hydrate, and a silicon content of less than 0.5% is desired, the silicon content can be reduced by treating the product with a small amount of hydrogen fluoride either in the form of an aqueous wash solution or in the form of a gas mixture. When using the hydrogen fluoride in a gas mixture, it is generally preferred to use a mixture containing 0.02 to 0.20 gram of hydrogen fluoride per liter of inert gas (at room temperature and atmospheric pressure). Dilute aqueous hydrogen fluoride wash solutions are also desirable since higher concentrations are generally more difficult to handle. It is, therefore, preferred to use aqueous solutions containing approximately 0.5 to 1.0 grams hydrogen fluoride per liter of water though concentrations of as high as 50 grams hydrogen fluoride per liter of water can be used.

The following example will help to better illustrate the production of synthetic cryolite by the process of the present invention. In the examples and throughout the specification and claims where the term "parts" is used, the parts are parts by weight.

Example 1

Five parts of a ground mixture containing stoichiometric amounts of sodium fluosilicate (3.84 parts) and aluminum sulfate (1.16 parts) were heated at 600° C. in a stream of dry air (67 milliliters per minute) for a total of 195 minutes. The weight losses at 75, 135, and 195 minutes were respectively, 42.6%, 42.8% and 42.8%. The theoretical weight loss is 42.5%. Although a flow rate of 67 milliliters per minute per square centimeter of cross-sectional area of reactor was used here, the same rate and extent of reaction was obtained in dry air flows of 20 milliliters per minute. In addition, complete reaction was also obtained under static conditions (no flow of atmosphere) with no particular difficulty.

After the 195 minute heating period, a stream of nitrogen containing 0.09 grams of hydrogen fluoride per liter of nitrogen was passed over the product mixture at 600° C. for one hour. Cryolite and sodium sulfate in the product was established by X-ray patterns.

The cooled mixture was separated by water extraction and the insoluble product, cryolite, dried at 110° C. It was noted, during the water extraction, that the cryolite settled and filtered rapidly. Furthermore, the solid was nearly invisible in water, indicating a pure cryolite, with an index of refraction very close to that of water.

The total silicon content (as silica) of the dried cryolite was 0.011%. Cryolite prepared in the same manner but omitting the nitrogen-hydrogen fluoride step usually contains 0.5 to 0.7% of silicon as silica.

The fluorine content of the cryolite was 53.6%, with theoretical as 54.3%.

The yields obtained based on theoretical were:

| | Per cent |
|---|---|
| $SiF_4$ (loss in weight) | 98 |
| $Na_3AlF_6$ | 99 |
| $Na_2SO_4$ | 100 |

The cryolite and sodium sulfate were identified by X-ray patterns.

Although a total of 3.2 parts of hydrogen fluoride were used, much smaller amounts would probably suffice to remove the silica. Actually, the amount of silica present, before hydrogen fluoride treatment, was about 0.01 part, which is equivalent to 0.013 part of hydrogen fluoride. The ease of removal of silica noted here and in other hydrogen fluoride treatments, for example, aqueous extraction of the product mixtures with 0.1% hydrogen fluoride, indicates that the silica is probably a surface coating on the cryolite. Further substantiation is the difference in appearance of a water suspension of cryolite treated with nitrogen-hydrogen fluoride mixtures and one which was not. The treated cryolite is practically invisible, as was noted before; the untreated cryolite, which contains only about 0.7% of silica, forms a much more opaque suspension in water.

Where the desired product is chiolite, the procedure is much the same as that described for cryolite, the main difference in the process being that the reactants are mixed together in the molar quantities of 14 moles sodium fluosilicate per 3 moles aluminum sulfate. The reaction is generally carried out at the same temperature as used for cryolite and the product processed in the same manner. It was found also that the rate of silicon tetrafluoride evolution in the chiolite-forming reaction was more rapid than in the cryolite-forming reaction.

The following example is illustrative of the production of chiolite in accordance with the present invention.

Example 2

Ten parts of a ground mixture containing stoichiometric amounts of sodium fluosilicate (7.19 parts) and aluminum sulfate (2.81 parts) were heated at 600° C. for one-half hour. The weight loss was 40.5%, which agrees well with the theoretical weight loss of 40.3%. Heating the mixture for an additional hour resulted in no weight change so that the reaction was complete in one-half hour. The presence of chiolite and sodium sulfate was established by X-ray patterns.

Five grams of the product mixture were extracted with water. The insoluble fraction, chiolite, was dried at 110° C. The soluble portion was evaporated to dryness and then dried at 110° C.

The chiolite yield obtained was 96% of theoretical.

The chiolite and sodium sulfate obtained by water separation were identified by X-ray patterns.

The total silicon content (as silica) of the chiolite product was 0.29%.

When it is desired that the final product be aluminum fluoride rather than cryolite, the sodium fluosilicate and aluminum sulfate are mixed together in the proportion of approximately three moles sodium fluosilicate per mole aluminum sulfate. This reaction is found to occur at somewhat lower temperatures than the reaction for making synthetic cryolite and the reaction can generally be carried out satisfactorily at temperatures of 400° to 525° C. though it is preferred that temperatures in excess of 450° C. be employed, the preferred temperature range being 475° to 525° C. If temperatures much in excess of 525° C. are employed, some liquefaction occurs. Grinding the reactants or sweeping the reactants with an inert gas did not appear to appreciably affect the rate or completion of the reaction as it had in the preparation of synthetic cryolite.

The aluminum fluoride can readily be separated from the solid aluminum fluoride-sodium sulfate product by washing with water, the insoluble aluminum fluoride settling to the bottom while the sodium sulfate is dissolved in the water.

The following example will help to better illustrate the production of aluminum fluoride by the process of the present invention.

Example 3

Ten parts of a mixture containing the stoichiometric amounts of sodium fluosilicate (6.22 parts) and anhydrous aluminum sulfate (3.78 parts) were ground together. The mixture was then heated at 500° C. for one hour and a weight loss of 34.7% obtained. Analysis of a sample of the product mixture (sodium sulfate and aluminum fluoride) showed that only 0.03% of silica (total silicon as silica) was present.

A 5.00 gram sample of the product mixture was added to 100 milliliters of water, the suspension heated to boiling and then allowed to cool to room temperature. A white solid, which was obtained after filtration of the suspension through a Büchner funnel, was washed with cool water until no test for sulfate was obtained in the filtrate. The solid was then dried at 110° C. and subsequently ignited at 500° to 650° C. for 35 minutes. The weight of the solid before ignition was 1.35 grams and after ignition, 1.32 grams.

The filtrate was evaporated to dryness over a gas flame and then dried at 110° C. The weight of this soluble fraction was 3.68 grams.

The insoluble fraction (aluminum fluoride) was analyzed for fluorine, aluminum and silicon. The yield of aluminum fluoride obtained was about 80% of the theoretical yield, the product having a purity of about 88% and a silicon content of 0.35%.

As above described, the synthetic cryolite, synthetic chiolite or aluminum fluoride, obtained by the process of the present invention, are obtained in high yields, the yields of insolubles generally being in the order of 95 to 100% for the cryolite and chiolite and 80 to 90% for the aluminum fluoride. Also, the cryolite and the chiolite are generally of a high degree of purity, the final products frequently analyzing 95 to 99% cryolite or chiolite. The process of our present invention also has many advantages over the prior art processes wherein reactions are generally carried out in the liquid phase either in aqueous solutions or in molten baths since the product yield is generally higher by the process of the present invention and the metal fluoride products are more easily separated from the other reaction products and are generally of a higher degree of purity. The problem of silica as a contaminant in the final product is also substantially eliminated.

Having thus described our invention, we claim:

1. The method of making fluorine-containing aluminum compounds comprising heating a substantially dry mixture of sodium fluosilicate and aluminum sulfate to a temperature of at least 200° C. but below that at which the mixture melts.

2. The method of making fluorine-containing aluminum compounds comprising heating a substantially dry mixture of sodium fluosilicate and aluminum sulfate to a temperature within the range of 200° C. to just below fusion temperature and washing the resulting solid product with water to separate therefrom the said metal fluoride of aluminum.

3. The method of making fluorine-containing aluminum compounds comprising heating a substantially dry mixture of sodium fluosilicate and aluminum sulfate to a temperature within the range of 200° C. to just below fusion temperature, treating the resulting fluoride of aluminum product with a fluid material substantially non-reactive with the resulting fluoride of aluminum and containing a small amount of hydrogen fluoride.

4. The method of making metal fluorides of aluminum comprising heating a substantially dry mixture of sodium fluosilicate and aluminum sulfate to a temperature within the range of 200° C. to just below fusion temperature and sweeping the resulting fluoride of aluminum product with a gas stream containing at least 0.02 grams hydrogen fluoride per liter, at room temperature and atmospheric pressure, of inert gas.

5. The method of making metal fluorides of aluminum comprising heating a substantially dry mixture of sodium fluosilicate and aluminum sulfate to a temperature within the range of 200° C. to just below fusion temperature and washing the resulting fluoride of aluminum product with an aqueous hydrogen fluoride solution containing 0.5 to 50 grams hydrogen fluoride per liter of water.

6. The method of making synthetic cryolite comprising heating, in a substantially dry atmosphere, a substantially dry mixture of sodium fluosilicate and aluminum sulfate in molar proportions of six moles sodium fluosilicate to one mole aluminum sulfate, said heating being at a temperature of 400° to 700° C.

7. The method of making synthetic cryolite comprising grinding together a dry mixture of sodium fluosilicate and aluminum sulfate in the molar proportions of six moles sodium fluosilicate for each mole of aluminum sulfate, heating said mixture to a temperature of 550° to 650° C. in an anhydrous atmosphere to cause a reaction between said sodium fluosilicate and aluminum sulfate, and grinding said mixture before completion of said reaction.

8. The method of making synthetic cryolite comprising heating a substantially dry mixture of sodium fluosilicate and aluminum sulfate in molar proportions of six moles sodium fluosilicate per mole aluminum sulfate to a temperature of 400° to 600° C. in an anhydrous atmosphere while sweeping said reactants with a gas inert to the reaction at a velocity of at least 5 milliliters per minute per square centimeter of reactor cross-sectional area and treating the resulting product with a small amount of hydrogen fluoride.

9. The method of making synthetic cryolite comprising heating a finely ground substantially dry mixture of sodium fluosilicate and anhydrous aluminum sulfate to a temperature of 400° to 700° C. to form a solid product comprising cryolite and sodium sulfate, sweeping said product with a gas inert to said solid products having therein at least 0.1% hydrogen fluoride, and then adding said product after said hydrogen fluoride treatment to a quantity of water to separate said cryolite and said sodium sulfate.

10. The method of making aluminum fluoride comprising heating to a temperature of 400° to 550° C. in a substantially dry atmosphere, a finely divided substantially dry mixture of sodium fluosilicate and aluminum sulfate, said materials being present in the molar proportions of three moles sodium fluosilicate for each mole aluminum sulfate.

11. The method of making synthetic chiolite comprising heating, in a substantially dry atmosphere, a substantially dry mixture of sodium fluosilicate and aluminum sulfate in molar proportions of 14 moles sodium fluosilicate to 3 moles aluminum sulfate, said heating being at a temperature of 400° to 650° C.

WILLIAM A. LA LANDE, JR.
ISADORE MOCKRIN.

No references cited.